March 13, 1928. 1,662,681
W. LINDNER
FRICTION WHEEL GEAR
Filed March 10, 1927
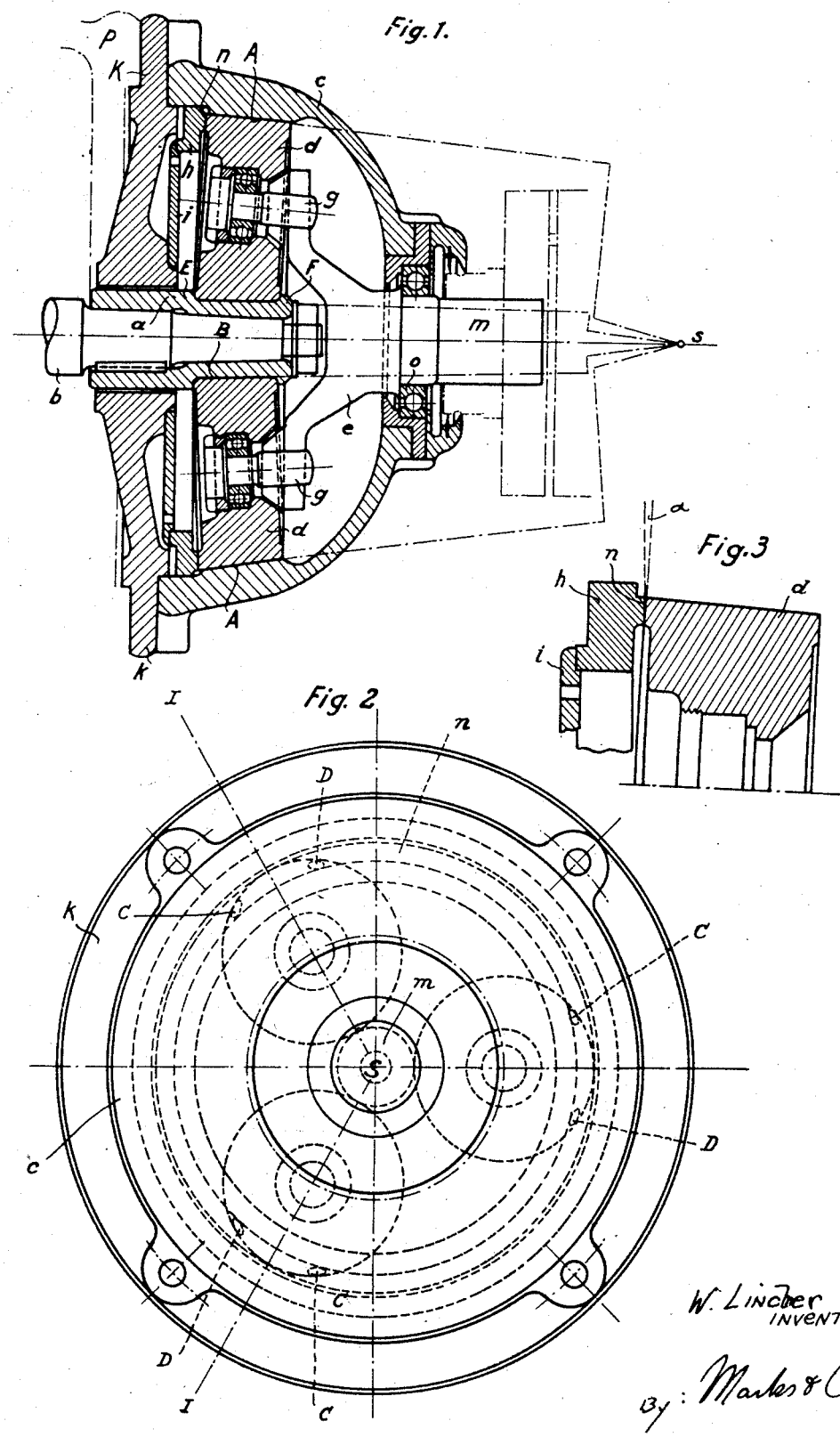

Patented Mar. 13, 1928.

1,662,681

UNITED STATES PATENT OFFICE.

WALTHER LINDNER, OF DUSSELDORF-GRAFENBERG, GERMANY, ASSIGNOR TO HOHENZOLLERN AKTIENGESELLSCHAFT FUR LOKOMOTIVBAU, OF DUSSELDORF-GRAFENBERG, GERMANY.

FRICTION WHEEL GEAR.

Application filed March 10, 1927, Serial No. 174,368, and in Germany March 6, 1926.

My invention relates to friction wheel gear wherein the transmission of power is effected by means of conical intermediate wheels or rollers cooperating with a conical central friction pinion and with an outer conical race provided in the gear casing.

These known gears are of elaborate construction, as the radial forces required for the transmission of the torque have to be produced in a complicated manner. Here the pinion shaft is as a rule pressed into the conical casing by a ball thrust bearing. The use of such thrust bearings, however, quite apart from the great loss of energy at high speeds of revolution, very soon reaches a limit. Furthermore, in the case of the gear constructions in question, elaborate means are necessary for the prevention of oblique setting of the intermediate wheels.

My invention overcomes these disadvantages by virtue of the fact that the radial application pressure requisite for the transmission of the torque is produced by a resiliently arranged pressure means or ring which bears on the outer end face of each of the intermediate rollers, and does so as close as possible to the race on the stationary casing on which the intermediate wheels roll. The contacting surfaces of the pressure ring on the one hand and of the intermediate rollers on the other hand are preferably so shaped that the intermediate rollers pass into engagement with the pressure ring at least at two places each, located at a certain distance from one another.

My invention is illustrated by way of example in one constructional form in the accompanying drawings, wherein Figure 1 is a section on the line I—I in Figure 2, Figure 2 is a diagrammatic view looking in an axial direction, and Figure 3 shows in detail the engagement of the pressure ring with one of said intermediate rollers in a larger scale.

The drawings are based on a construction of the gear, regarded as being directly coupled to an electric motor, the speed of revolution of which is to be reduced in transmission. To the shaft $b$ of the motor, the casing of which is marked by $p$, a driving pinion $a$ is keyed which consists of a steel sleeve ground slidably conical towards the outer end and provided on the ground part with collars E and F. With the pinion $a$ there co-operate three intermediate rollers $d$, which are supported by means of ball bearings on journal pivots $g$ on a three-armed driver spider $e$. Externally the intermediate rollers $d$ frictionally engage with a running surface A on a casing $c$, which in the case of the constructional form illustrated is bolted to the casing $p$ of the motor in question through the medium of a shield $k$. The spider $e$ is integral with a driven shaft $m$, which rests in a ball bearing $o$ fitted into the casing $c$. The running surface A, upon which these intermediate wheels $d$ roll, the treads of the intermediate wheels themselves, and also the running surface B of the pinion $a$, form conical surfaces, which all converge to a common point S located on the axis of the gear, so that at the lines of contact both between the pinion and the intermediate rollers and between the latter and the casing only rolling friction occurs. All engaging surfaces are hardened and ground.

The pressure necessary between the mutually engaging members, for the transmission of the torque, is produced by a ring $h$, which is pressed against the three intermediate rollers $d$ by a disc $i$ of steel or other resilient material which bears with its outer margin against the ring $h$ but bears internally against the hub part of the shield $k$. The ring $h$, which forms the medium of the application pressure, is provided with an annular ledge $n$. This ledge is disposed as far as possible outwards and close to the race A, in order to keep the relative movements and relative velocities between the pressure ring $h$ and the intermediate rollers $d$ as small as possible. The angle $\alpha$ (Figure 3) which a radius lying in the engaging surface of each intermediate roller and going through the gear axis makes with a radius lying in the same axial plane and in the opposite engagement surface of the ledge $n$ of the ring $h$ is so selected that the pressure ring $h$ comes into contact with the rollers at two points each, C and D (Figure 2), which are at considerable distances from each other and from the said radius or centre line passing through the axis. The angle should not be too small, as the engaging positions would then come to lie upon the inner edge of the pressure ring, and a heavy scouring would be the result, while in the event of the angle being too large, the engaging positions would lie too close together to obviate the oblique setting of the intermediate rollers $d$. In all events the angle should be open towards the periphery. As a rule such a construction will answer to the said conditions, in which the engagement surface of the pressure ring $h$ and the engagement surface of the intermediate rollers are formed as planes. In this case the angle $\alpha$ is equal to the angle which make the journal axes of the intermediate rollers with the gear axis.

Internally the three intermediates rollers are tightly fitted in and guided by the collars E and F on the pinion $a$. By axial adjustment of the bearing $o$ the driver $e$ can be so shifted that no jamming can occur in the bearings of the intermediate wheels. The shaft $b$ must be somewhat shiftable in an axial sense, so that the rollers $d$ may be able to follow, if necessary, to the axial pressure exerted to them by the ring $h$.

In the case of the constructional form illustrated the pinion $a$ serves at the same time to a certain extent as a journal for the motor shaft $b$, which is centrally supported by the three intermediate rollers surrounding it. A special bearing for the motor shaft $b$ at the gear end is therefore superfluous.

I claim:—

1. In a friction gear, a central conical friction roller, a conical rolling race, at least three conical intermediate rollers in frictional engagement with said central roller and said race, journals for said intermediate rollers, a rotatable body carrying said journals, and means adapted to exert an axial pressure on peripheral portions of the end face of each of said intermediate rollers for the purpose of holding said intermediate rollers in frictional engagement with said central friction roller and said rolling race.

2. In a friction gear, a central conical friction roller, a conical rolling race, at least three conical intermediate rollers in frictional engagement with said central roller and said race, journals for said intermediate rollers, a rotatable body carrying said journals, and means adapted to press said intermediate rollers against said central roller and said race, said means comprising a ring shaped body arranged near said race and engaging opposite end face portions of each of said intermediate rollers adjacent the periphery of said intermediate rollers.

3. In a friction gear, a central conical friction roller, a conical rolling race, at least three conical intermediate rollers in frictional engagement with said central roller and said race, journals for said intermediate rollers, a rotatable body carrying said journals, and means adapted to press said intermediate rollers against said central roller and said race, said means comprising a ring in close proximity of said race and having a ledge projecting axially towards said intermediate rollers, said ledge adapted to engage opposite end face portions of said intermediate rollers near said race.

4. In a friction gear, a central conical frictional roller, a conical rolling race, at least three conical intermediate rollers in frictional engagement with said central roller and said race, journals for said intermediate rollers, a rotatable body carrying said journals, and means adapted to press said intermediate rollers against said central roller and said race, said means comprising a ring in close proximity of said race and having a ledge projecting axially towards said intermediate rollers, said ledge adapted to engage opposite end face portions of said intermediate rollers at two points located a certain distance apart from each other.

5. In a frictional gear, a central conical friction roller, a conical rolling race, at least three conical intermediate rollers in frictional engagement with said central roller and said race, journals for said intermediate rollers, a rotatable body carrying said journals, and means adapted to press said intermediate rollers against said central roller and said race, said means comprising a ring in close proximity of said race and having a ledge projecting axially towards said intermediate rollers, said ledge adapted to engage opposite end face portions of said intermediate rollers at two points located a certain distance apart from each other and symmetrically to a plane regarded as being laid through the gear axis and through the axis of the respective intermediate roller.

6. In a friction gear, a central conical friction roller, a conical rolling race, at least three conical intermediate rollers in frictional engagement with said central roller and said race, journals for said intermediate rollers, a rotatable body carrying said journals, and means adapted to exert an axial pressure at two points of each of said intermediate rollers located a certain distance apart from each other and symmetrically to a plane regarded as being laid through the gear axis and through the axis of the respective intermediate roller.

7. In a friction gear, a central conical friction roller, a conical rolling race, at least three conical intermediate rollers in frictional engagement with said central roller and said race, journals for said intermediate rollers, a rotatable body carrying said journals, and resilient means adapted to exert an axial pressure at two points of each of said intermediate rollers located a certain distance apart from each other and symmetrically to a plane regarded as being laid through the gear axis and through the axis of the respective intermediate roller.

8. In a friction gear, a central conical friction roller, a conical rolling race, at least three conical intermediate rollers in frictional engagement with said central roller and said race, journals for said intermediate rollers, a rotatable body carrying said journals, and pressure means engaging each of said intermediate rollers in two points spaced apart from each other and from the journal axis of the respective intermediate roller.

9. In a friction gear, a central roller having a conical friction surface, a race having a conical friction surface, at least three intermediate rollers each having a conical friction surface, all of said conical surfaces converging to a common point located in the axis of said central roller, said intermediate rollers adapted to engage both said race and said central roller, and means to exert an axial pressure on said intermediate rollers in the direction to said common point, said means comprising a resiliently arranged pressure ring adapted to engage each of said intermediate rollers at points disposed near said race.

10. In a friction gear, a central roller having a conical friction surface, a race having a conical friction surface, at least three intermediate rollers each having a conical friction surface, all of said conical surfaces converging to a common point located in the axis of said central roller, said intermediate rollers adapted to engage both said race and said central roller, and means to exert an axial pressure on said intermediate rollers in the direction to said common point.

11. In a friction gear, a central roller having a conical friction surface, a race having a conical friction surface, at least three intermediate rollers each having a conical friction surface, all of said conical surfaces converging to a common point located in the axis of said central roller, said intermediate rollers adapted to engage both said race and said central roller, and means to exert an axial pressure on said intermediate rollers in the direction to said common point, said means comprising a resiliently arranged pressure ring adapted to engage each of said intermediate rollers at points disposed near said race and a disc of resilient material adjacent to said pressure ring.

12. A friction gear comprising, a casing having an internal conical rolling race, a friction roller centrally disposed within said casing, at least three conical intermediate rollers within said casing, a shaft rotatably mounted centrally to said casing, said shaft having radial projecting parts, journal means carried from said projecting parts and adapted to carry said intermediate rollers, a pressure ring adapted to exert an axial pressure on said intermediate rollers at points located near their periphery, and a spring plate adjacent to said pressure ring and said casing.

13. In a friction gear, a central conical pinion, a conical rolling race surrounding said pinion, at least three conical intermediate wheels in frictional engagement with said pinion and said race, journals carrying said wheels, a driver carrying said journals, a pressure ring having an engagement face lying across to the axis of said pinion, each of said wheels having an end face lying across to its axis and adapted to engage said engagement face, said engagement face making with each of said end faces an outwardly open acute angle, and means to exert an axial pressure on said pressure ring.

14. In a friction gear, a central conical pinion, a conical rolling race surrounding said pinion, at least three conical intermediate wheels in frictional engagement with said pinion and said race, journals carrying said wheels, a driver carrying said journals, a pressure ring having a plane engagement face rectangular to the axis of said pinion, each of said wheels having a plane end face rectangular to its axis and adapted to engage said engagement face at two points spaced apart from each other, and means to exert an axial pressure on said pressure ring.

15. In a friction gear, a central conical pinion, a conical rolling race surrounding said pinion, at least three conical intermediate wheels in frictional engagement with said pinion and said race, journals carrying said wheels, a driver carrying said journals, a pressure ring having a plane engagement face rectangular to the axis of said pinion, each of said wheels having a plane end face rectangular to its axis and adapted to engage said engagement face at two points spaced apart from each other, and a spring plate adapted to exert an axial pressure on said pressure ring.

16. In a friction gear, a conical friction pinion, a conical rolling race, at least three conical wheels adapted to engage said pinion and said race, each of said wheels having an end face substantially rectangular to its axis, journals for said wheels, a driver carrying said journals, and a ring having an axially projecting engagement face adapted to engage the end faces of said wheels, said end faces and said engagement face forming substantially plane surfaces, and spring means to exert an axial pressure on said ring.

In testimony whereof I affix my signature.

WALTHER LINDNER.